H. W. WINTER.
STAMPING MACHINE.
APPLICATION FILED MAR. 20, 1915.

1,282,158.

Patented Oct. 22, 1918.
2 SHEETS—SHEET 1.

WITNESSES.

INVENTOR.

H. W. WINTER.
STAMPING MACHINE.
APPLICATION FILED MAR. 20, 1915.

1,282,158.

Patented Oct. 22, 1918.
2 SHEETS—SHEET 2.

WITNESSES
Herbert W. Kenway.
Norman C. Hussey.

INVENTOR
Henry W. Winter
By his Attorney
Nelson W. Howard

UNITED STATES PATENT OFFICE.

HENRY W. WINTER, OF METHUEN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

STAMPING-MACHINE.

1,282,158.

Specification of Letters Patent.  Patented Oct. 22, 1918.

Application filed March 20, 1915.  Serial No. 15,727.

*To all whom it may concern:*

Be it known that I, HENRY W. WINTER, a citizen of the United States, residing at Methuen, in the county of Essex and State of Massachusetts, have invented certain Improvements in Stamping-Machines, of which the following description, in connection with the accompanying drawings, is a specification, like reference characters on the drawings indicating like parts in the several figures.

This invention relates to machines for stamping or otherwise impressing such material as sole leather. Material of this kind varies appreciably in thickness and in density or hardness and it is an object of the present invention to provide a machine by the use of which, without special adjustments, an impression of uniform appearance and depth may be imparted to material of these varying characteristics.

An important feature of the invention consists in a stamping machine having a work supporting member and a coöperating die member, one of which is arranged to be moved to exert a preliminary pressure of a uniform degree on the work regardless of its characteristics and the other of which is arranged to be moved to effect the impression. An advantage incident to this construction and arrangement is that each of the coöperating members may be operated through an independent train of mechanism in such manner as best to meet the requirements of the case. For example, the movement of one of the members is effected in a yielding manner for bringing about the preliminary engagement of the work, while the other member is moved positively to a predetermined point for effecting an impression of predetermined depth.

As herein shown, and in accordance with another feature of the invention the die member is arranged for movement in a variable path determined by the work to be operated on, while the supporting member is arranged for movement subsequently in a predetermined path in the opposite direction.

Another feature of the invention consists in novel mechanism for moving one of the coöperating supporting and die carrying members. It has been found desirable to bring about the preliminary engagement of the work by moving one of the members in a yielding manner until the work is encountered and then to maintain said member rigidly in position during the impression. With this end in view an important feature of the invention consists in a stamping machine having a die carrying head and means for actuating the head interposed between the frame and the head and including a movable wedge member. Such mechanism is accurate and positive in action as well as simple in construction.

In stamping certain articles, such as shoe soles, it is desired to place on each article identifying symbols for indicating both the order number under which the blanks are to be used and the size or other characteristic of the particular blank. The order number will be the same for several dozen blanks while the size numbers may vary with each successive blank handled by the operator. Another object of the present invention is to provide a machine which may be used conveniently for this class of work. To this end a feature of the invention consists in the provision of a stamping head comprising a type carrier arranged to receive the type of the relatively permanent symbol and an independently adjustable type disk which may be set in accordance with the characteristics of each individual blank.

These and other features of the invention will be best understood and appreciated from the following description of a preferred embodiment thereof selected for purposes of illustration and shown in the accompanying drawings, in which—

Figure 1:
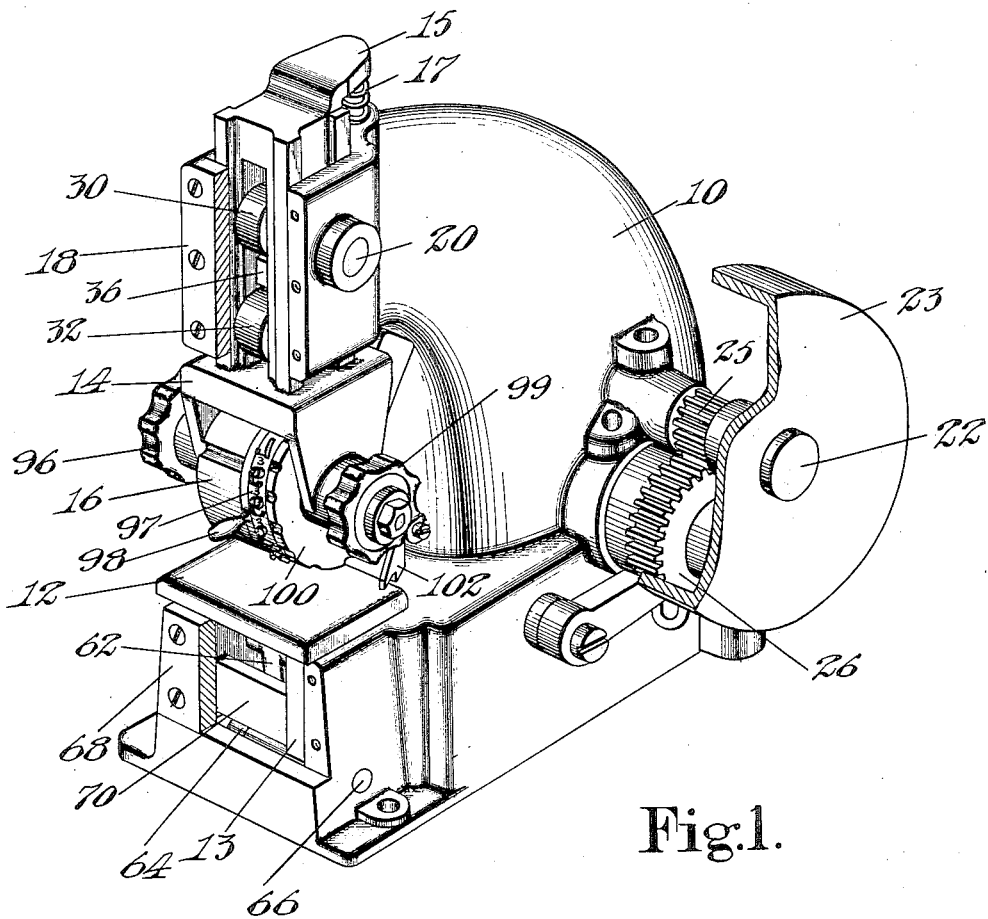
Figure 1 is a view in perspective of the machine.

The machine frame 10 is shaped with a lower jaw in which is mounted the work supporting plate 12 and with an overhanging jaw in which is mounted the die carrying member 14. The frame also has journals for a driving shaft 22 and for a cam shaft 24 by which the moving parts of the machine are actuated.

The driving shaft 22 carries a pulley 23 by which power is imparted to the machine. This shaft also carries a pinion 25 which meshes with a gear 26 loose upon the cam shaft 24. Suitable clutch mechanism, not shown, may be arranged for clutching the gear 26 to the cam shaft 24 when it is desired to set the machine in operation. The clutch mechanism is not illustrated herein as it forms no part of the present invention.

The die carrier member 14 extends upwardly through vertical bearings formed partly by the machine frame and partly by a cover plate 18 secured to the frame. At its upper end the carrier 14 has a rearwardly projecting arm 15 beneath which is disposed a compresion spring 17 by which the carrier is normally maintained in an elevated position. At its lower end the spring 17 is retained within a socket formed in the frame 10.

The carrier member is cut away to receive a pair of rollers 30 and 32 and is also slotted to receive the stationary journal pin 20 which extends through the upper jaw of the machine frame. The upper roller 30 is journaled upon the stationary pin 20 while the lower roller 32 is journaled upon a pin 34 set in the carrier 14. A wedge member 36 is arranged normally with its reduced end interposed between the two rollers, the lower roller being pressed upwardly against it by the action of the spring 17. The die carrier is moved downwardly into preliminary engagement with the work by the action of the wedge member 36 when the latter is moved forwardly. For this purpose the wedge member 36 is connected at its rear end to the upper end of one arm 38 of a two-part cam lever. The lower arm 40 of the cam lever carries a cam roller 42 arranged to run in a cam track in the cam disk 44. The cam track is so shaped as to swing cam lever 38—40 to advance the wedge member 36 as soon as the machine is set in operation. The forward movement of the wedge member 36 continues until the downward movement of the die is arrested by the work, although the throw of the lower arm 40 of the cam lever is constant. To permit this action a frictional connection is provided between the two arms 38 and 40. The upper arm 38 is provided with an outwardly extending hub 46 which passes through the hollow hub 48 of the lever arm 40. The hub 48 is journaled in a boss in the machine frame 10 and is provided at its inner bearing face with a ring 50 of frictional material such as leather. Outside the frame the hub 46 is surrounded by a pair of washers and a ball bearing member 52 which serves to prevent the development of friction between the moving parts and the stationary frame 10. The outer end of the hub 46 is threaded to receive a pair of nuts 54 by which the pressure between the two parts of the cam lever may be adjusted. By regulating the frictional engagement between the two arms of the cam lever the preliminary pressure of the die upon the work may be regulated for the arm 38 of the cam lever will be advanced to depress the die until slipping occurs at this place. After the impression has taken place and the arm 38 is moved rearwardly it will encounter a stop formed by a portion of the frame which serves to establish its initial position and hold it while the lower arm 40 is slipped reversely by the cam into its initial position relatively to the arm 38.

The work supporting table 12 is provided at its lower side with downwardly extending side pieces 13, by which it is guided in the frame, and with ears 60 between which is pivoted the upper end of a bell crank lever 62 so arranged as to constitute the upper member of a toggle. The lower member of the toggle comprises a pair of spaced links 64 pivoted at their lower ends upon a stationary transverse pin 66 set in the machine frame. Beneath the work supporting plate 12 the frame is provided with a removable plate 68 for the purpose of providing access to this portion of the machine. Between the side pieces 13 of the work supporting member extends a bar 70, as shown in Fig. 1.

The rear arm of the bell crank lever 62 is pivotally connected to a cam rod 72 slotted at its rear end to receive the cam shaft 24 by which the rod is guided. The shaft 24 carries a cam 74 arranged to act against a cam roller 76 carried by the rod 72. The cam 74 acts positively to advance the rod 72, straightening the toggle to elevate the work plate, while a tension spring 78, extending between an ear on the rod and an eye in the machine frame, tends normally to move the rod rearwardly and hold the cam roller 76 against the periphery of the cam 74. An adjusting screw 80 is threaded into a boss in the machine frame in position to engage the rear end of the rod 72 and so determine its initial position. By turning the screw 80 inwardly the rod 72 is advanced and the initial position of the work plate elevated. The path of movement of the plate 12 is therefore reduced and the depth of the impression correspondingly decreased. It will be understood that the final position of the work plate is fixed but that the extent of its movement in producing the impression is dependent upon its initial position.

Figure 3:
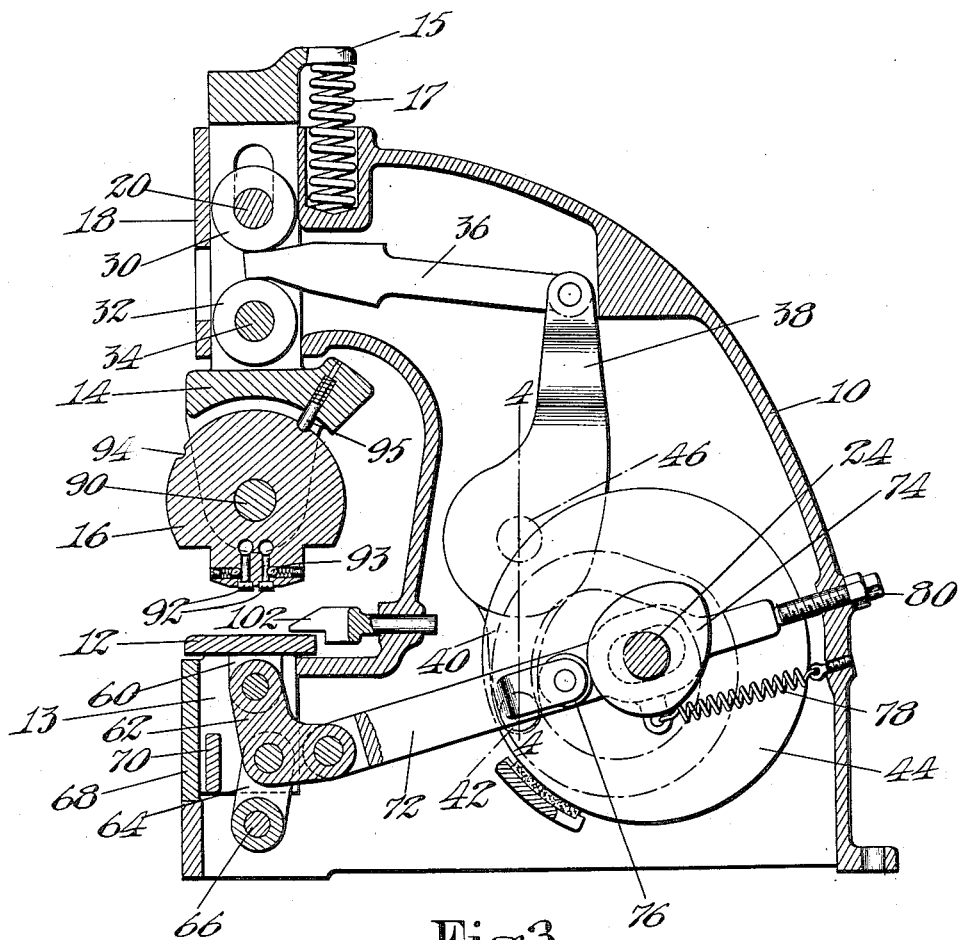
Fig. 3 is a sectional elevation of the machine.
Figure 4:
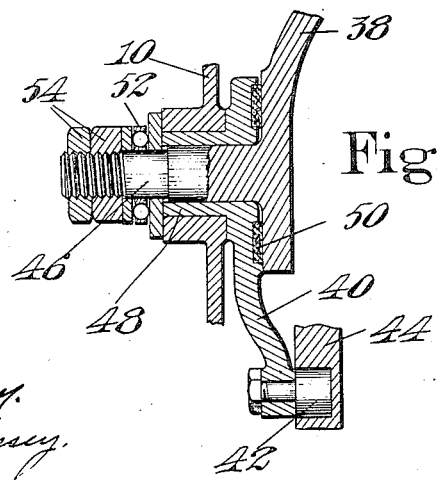
Fig. 4 is a cross-sectional view on the line 4—4 of Fig. 3.

The die members include a turret 16 journaled upon a pin 90 extending between arms formed on the carrier 14. The turret 16 has sockets to receive two rows of stamping die type 92. Each die, as shown in Fig. 3, has a recessed shank and is detachably retained in place by a spring pressed ball 93 arranged in a socket in the turret. The turret 16 is provided in its periphery with two grooves either of which is arranged to be moved into engagement with a spring plunger 95 mounted in the rear portion of the carrier so that the turret is held yieldingly in operative position, as shown in Fig. 3, or in an inoperative position with the type 92 exposed to the operator. The desired type is inserted in the turret while in the latter position and then the turret is turned to its operative position by means of a hand wheel 96 disposed at the left side of the carrier 14. The type mounted in the turret 16 may indicate case, sheet number and factory or other designations by which it is desired to identify a large number of pieces of the work.

Figure 2:
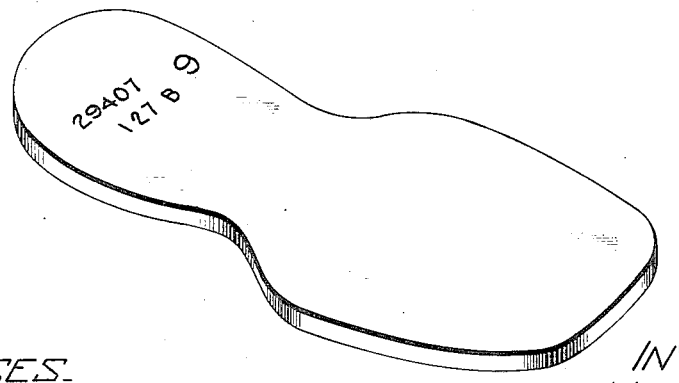
Fig. 2 shows a sole which has been stamped in the machine.

A sole is shown in Fig. 2 which has been stamped by the machine herein disclosed and on this sole the symbols 29407 and 127B were impressed by the type in the turret 16. The number 29407 indicates the order under which the sole is made, 127 is the sheet number, while B is the factory designation.

Next to the turret 16 upon the shaft 90 is disposed a type disk 97 having on its periphery figures to designate various sizes, in case the machine is to be used for stamping soles. This disk is arranged to be set by a hand wheel 99 on the right side of the carrier 14. A disk 100 for indicating half sizes is arranged next to the size indicating disk 97 and this is connected to an intermediate disk having a handle 98 by which the half size disk may be oscillated to bring the half size indication into or out of stamping position. In Fig. 2 the number 9 indicates the size of the blank.

A gage member is arranged to locate the work upon the plate 12 in the proper position with respect to the dies. As herein shown this comprises a Y-shaped member 102 having its shank received in a boss in the machine frame. This is arranged to receive the heel end of a shoe presented upon the plate 12 and to locate it during the operation of the machine.

In operating the machine the order, sheet and factory designations are set up in the turret 16 and the disks 97 and 100 are turned to locate the proper size indicating type in operative position. The sole is then placed upon the plate 12, its heel end being located by the gage 102, and the machine is started. The die carrier 14 immediately descends bringing the type into preliminary engagement with the sole with a pressure dependent upon the setting of the nuts 54. Finally the plate 12 and sole are elevated a distance dependent on the setting of the stop 80 and the impression is formed. The parts are then returned to initial position and the machine automatically stopped.

Having thus described my invention, I claim as new and desire to secure by Letters Patent of the United States:

1. A stamping machine, having in combination, a work support, a stamping die occupying a normal position out of contact with the work, operating mechanism for moving the die from its normal position to exert a uniform preliminary pressure on work, and means for moving the support a predetermined distance toward the die to effect the impression.

2. A stamping machine, having, in combination, a work supporting member and a die member arranged for relative movement, operating mechanism for moving one of said members to exert a uniform preliminary pressure upon the work regardless of its thickness, and means for moving the other of said members to effect the impression.

3. A stamping machine, having, in combination, a work supporting member arranged for movement in a predetermined path, a die member arranged for movement in the opposite direction and in a variable path determined by the work to be operated upon, and operating means arranged to control the movement of the die member throughout its path.

4. A stamping machine, having, in combination, a work support, a stamping die, means including frictional connections for moving the stamping die yieldingly into preliminary engagement with the work constructed and arranged to hold the die stationary in its position of engagement, and means for moving the work support to effect the impression while the die is so held.

5. A stamping machine, having, in combination, a frame, a die carrying head movable in the frame, a roller journaled in the frame, a movable wedge member interposed between said roller and head, and power-operated means for forcing the wedge against the roller.

6. A stamping machine, having, in combination, a frame, a die carrying head movable in the frame, and means for actuating the head interposed between the frame and head and including a movable wedge member and frictional driving connections therefor.

7. A stamping machine, having, in combination, a frame, a movable die carrying head, oppositely disposed rollers mounted in the frame and head respectively, and a wedge member arranged for movement in a path between the rollers and being also movable toward and from the rollers.

8. A stamping machine, having, in combination, a work support, a die carrying head arranged to reciprocate in a path above the support, a spring for maintaining the head normally in an elevated position, and a yieldingly actuated wedge member acting in opposition to the spring and shaped to hold the head positively against upward movement in whatever position the head may occupy.

9. A stamping machine, having, in combination, a work supporting member and a die member arranged for relative movement, means for moving one of said members to exert a uniform preliminary pressure upon the work regardless of its thickness, adjustable means for regulating said preliminary pressure, and means for moving the other of said members to effect the impression.

10. A stamping machine, having, in combination, a work support and a die member arranged for relative movement, means for moving one of said members including a two-part cam lever having an adjustable frictional connection between its two parts.

11. A stamping machine, having, in combination, a movable work support, a movable die member, an actuating shaft, and independent trains of mechanism associated with the actuating shaft, one for moving relatively the support and die member to impart a preliminary pressure automatically made uniform regardless of the thickness of the work and the other for effecting a final movement of the support and die member to produce the impression.

12. A stamping machine, having, in combination, a movable work support, a movable die member, an actuating shaft, a train of mechanism including frictional connections between the shaft and die member operable to effect and maintain the preliminary engagement of the work with a substantially uniform degree of pressure, and a second train of mechanism between the shaft and support operable to effect the impression.

13. A stamping machine, having, in combination, a work supporting member and a die member arranged for relative movement, means for moving one of said members preliminarily from its normal position to subject the work to a substantially uniform degree of pressure, and means for moving the other of said members to effect the impression, said means having provision for adjustment for varying the depth of the impression.

14. A stamping machine, having, in combination, a die member, a work support arranged to reciprocate periodically toward the die member to a fixed point, power-operated means for effecting the periodic reciprocation, and means for adjusting the initial position of the support.

15. A stamping machine, having, in combination, a die member movable into preliminary engagement with the work, a work support movable toward the die member with the work to effect the impression, mechanism for moving the support, and means for preliminarily adjusting the initial position thereof.

16. A sole stamping machine, having, in combination, a coöperating sole support and stamping head, a spring normally urging the stamping head away from the support, and a yieldingly operated wedge member acting on the head in opposition to the spring and shaped to hold the head positively against movement from the support in whatever position the head may occupy.

17. A stamping machine, having, in combination, a work supporting member, a coöperating die member, and a shaft for actuating both of said members through independent trains of mechanism, one of said trains including a wedge and a slip connection and the other including a toggle.

18. A stamping machine, having, in combination, a work supporting member, a coöperating die member, mechanism for moving one of said members including a movable wedge actuated through a slip connection, and means for arresting the wedge in a predetermined initial position during its reverse movement.

In testimony whereof I have signed my name to this specification in the presence of two subscribing witnesses.

HENRY W. WINTER.

Witnesses:
CHESTER E. ROGERS.
LAURA M. GOODRIDGE.